United States Patent
Nakamura et al.

(10) Patent No.: US 8,297,037 B2
(45) Date of Patent: Oct. 30, 2012

(54) GAS TURBINE AND METHOD OF FORMING COMBUSTOR INSERTION HOLE OF GAS TURBINE

(75) Inventors: Sosuke Nakamura, Hyogo (JP); Kenichi Arase, Hyogo (JP); Norihiko Motoyama, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/933,870

(22) PCT Filed: Dec. 1, 2008

(86) PCT No.: PCT/JP2008/071812
§ 371 (c)(1),
(2), (4) Date: Sep. 21, 2010

(87) PCT Pub. No.: WO2009/118956
PCT Pub. Date: Oct. 1, 2009

(65) Prior Publication Data
US 2011/0016865 A1    Jan. 27, 2011

(30) Foreign Application Priority Data
Mar. 28, 2008 (JP) ................... 2008-088746

(51) Int. Cl.
*F02C 3/00* (2006.01)
(52) U.S. Cl. .................... 60/39.37; 60/796
(58) Field of Classification Search ......... 60/752–760, 60/796–800, 39.37; 29/889.2
See application file for complete search history.

(56) References Cited

U.S. PATENT DOCUMENTS

| | | | | |
|---|---|---|---|---|
| 5,197,289 A | * | 3/1993 | Glevicky et al. | 60/746 |
| 5,524,430 A | * | 6/1996 | Mazeaud et al. | 60/798 |
| 5,911,680 A | | 6/1999 | Takeoka | |
| 6,141,862 A | | 11/2000 | Matsui et al. | |
| 6,282,886 B1 | * | 9/2001 | Sato et al. | 60/39.37 |
| 6,327,861 B2 | | 12/2001 | Sato et al. | |
| 6,634,175 B1 | | 10/2003 | Kawata et al. | |
| 7,647,779 B2 | * | 1/2010 | Shi et al. | 60/800 |
| 2008/0236164 A1 | * | 10/2008 | Bunel et al. | 60/740 |
| 2011/0000080 A1 | * | 1/2011 | Arase et al. | 29/700 |

FOREIGN PATENT DOCUMENTS

| | | |
|---|---|---|
| JP | 9079577 | 3/1997 |
| JP | 09-168931 A | 6/1997 |
| JP | 2000-171038 A | 6/2000 |

(Continued)

OTHER PUBLICATIONS

ISR for PCT/JP2008/071812 mailed Dec. 22, 2008.
Japanese Office Action for Application No. 2008-088746 mailed Mar. 13, 2012.

(Continued)

*Primary Examiner* — Phutthiwat Wongwian
(74) *Attorney, Agent, or Firm* — Lowe, Hauptman, Ham & Berner, LLP

(57) ABSTRACT

A gas turbine includes a combustor, a combustor casing formed in a cylindrical shape to house the combustor therein, and a combustor insertion hole, which is a hole formed on a side periphery of the combustor casing, where a size thereof in a direction orthogonal to a circumferential direction of the combustor casing is formed larger than that in the circumferential direction of the combustor casing, and when the combustor inserted into the hole, a member moved together with the combustor, and the hole are viewed from a moving direction of the combustor, the hole includes an entire external form of the combustor and the member moved together with the combustor.

4 Claims, 4 Drawing Sheets

FOREIGN PATENT DOCUMENTS

| | | |
|---|---|---|
| JP | 2000-346361 A | 12/2000 |
| JP | 2003-232039 A | 8/2003 |
| KR | 109930021926 | 11/1993 |
| KR | 1019930021926 | 11/1993 |

OTHER PUBLICATIONS

Korean Office Action for Application No. 10-2010-7021239 mailed Apr. 2, 2012.

* cited by examiner

GAS TURBINE AND METHOD OF FORMING COMBUSTOR INSERTION HOLE OF GAS TURBINE

RELATED APPLICATIONS

The present application is national phase of International Application Number PCT/JP2008/071812 filed Dec. 1, 2008, and claims priority from, Japanese Application Number 2008-088746 filed Mar. 28, 2008.

TECHNICAL FIELD

The present invention relates to a gas turbine and a method of forming a combustor insertion hole of a gas turbine.

BACKGROUND ART

Conventionally, as an apparatus that extracts energy from combustion gas generated by burning fuel, there is a gas turbine in which a turbine is rotated by using the energy of the combustion gas generated by burning fuel and rotation energy is output from a rotor.

For example, Patent Document 1 discloses a technique for facilitating assembly and disassembly of a combustor of a gas turbine by a gas turbine assembling/disassembling apparatus for assembling or disassembling the combustor of the gas turbine.

Patent Document 1: Japanese Patent Application Laid-open No. H9-168931

DISCLOSURE OF INVENTION

Problem to be Solved by the Invention

An outlet of a transition piece of a combustor has a wide lateral width. Therefore, in the technique disclosed in Patent Document 1, as described in its paragraph 0053, when it is tried to pull out the combustor from a casing, the transition piece interferes with a vertically long slot (a combustor insertion hole) formed in the casing. Consequently, the combustor is required to be rotated for pulling out the combustor from the casing. Therefore, in the technique disclosed in Patent Document 1, an assembly operation or a disassembly operation of the gas turbine is not sufficiently facilitated.

Further, because the combustor has a role to change a flow direction of combustion gas, the shape of the combustor is not an axisymmetric shape, but a curved shape as a whole (in an embodiment, the transition piece is curved). Further, a member that is moved together with the combustor such as a steam pipe for cooling the combustor may be attached (in an embodiment, a pipe is attached to the transition piece). Also from this viewpoint, when the combustor is taken out from the casing, the combustor needs to be rotated or inclined to avoid an interference with the combustor insertion hole, taking the shape and attachment of the combustor into consideration. However, because the combustor is heavy, there is a problem that the burden on workers is large, and a certain period of time is required for the operation.

Meanwhile, if only avoiding the interference with the combustor is necessary, it suffices that the diameter of the combustor insertion hole is increased. However, because a plurality of combustors are provided in a state adjacent to each other in a circumferential direction of the combustor casing, by only increasing the diameter of the combustor insertion hole, a distance between adjacent combustor insertion holes decreases and the strength of the combustor casing may decrease.

The present invention has been achieved to solve the above problems, and an object of the present invention is to facilitate an assembly operation or a disassembly operation of a gas turbine, and to ensure strength of a combustor casing.

Means of Solving Problem

According to an aspect of the present invention, a gas turbine includes: a combustor that burns fuel to generate combustion gas; a combustor casing that is formed in a cylindrical shape and houses the combustor inside thereof; and a combustor insertion hole, which is formed on a side periphery of the combustor casing to connect the inside and outside of the combustor casing, wherein a size thereof in a direction orthogonal to a circumferential direction of the combustor casing is formed larger than that in the circumferential direction of the combustor casing, and when the combustor inserted into the hole, a member moved together with the combustor, and the hole are viewed from a moving direction of the combustor, the hole includes an entire external form of the combustor and the member moved together with the combustor.

According to the above configuration, in the gas turbine according to the present invention, when the combustor and the member moved together with the combustor are inserted into inside of the combustor casing via the combustor insertion hole, or when the combustor and the member moved together with the combustor are pulled out from inside of the combustor casing via the combustor insertion hole, even if the combustor and the member moved together with the combustor are moved in a predetermined direction, the combustor and the member moved together with the combustor do not interfere with the combustor casing near the combustor insertion hole.

With this configuration, the combustor and the member moved together with the combustor are inserted into inside of the combustor casing via the combustor insertion hole in the gas turbine, without being rotated or inclined. Further, the combustor and the member moved together with the combustor are pulled out from inside of the combustor casing via the combustor insertion hole in the gas turbine, without being rotated or inclined. As a result, the assembly operation or the disassembly operation of the gas turbine is facilitated in the gas turbine.

Further, the shape of the combustor insertion hole of the gas turbine is formed such that the size thereof in a direction orthogonal to the circumferential direction of the combustor casing is larger than that in the circumferential direction of the combustor casing. Accordingly, when a plurality of combustor insertion holes are formed in the circumferential direction of the combustor casing in the gas turbine, a decrease in the distance between adjacent combustor insertion holes can be suppressed. As a result, a decrease in the strength of the combustor casing between the adjacent combustor insertion holes can be suppressed in the gas turbine.

Advantageously, in the gas turbine, the combustor insertion hole is formed by combining a plurality of circular holes with centers thereof being different from each other.

The thickness of the combustor casing is generally about 100 millimeters. Therefore, accuracy of the combustor insertion hole may decrease due to insufficient rigidity of a tool according to its processing method. In the gas turbine according to the present invention; however, according to the above configuration, the combustor insertion hole is formed by combining circular holes, which require relatively small rigidity of the tool at the time of processing. Accordingly, the combustor insertion hole of the gas turbine is formed with high accuracy.

Advantageously, the gas turbine includes a spacer that is provided in a gap between the combustor and an inner peripheral surface of the combustor insertion hole at a time of installing the combustor inside the combustor casing, so as to fill the gap generated between the combustor and an inner circumference of the combustor insertion hole.

According to the above configuration, the spacer of the gas turbine according to the present invention fills the gap between the combustor and the combustor casing, to suppress disturbance of air flow inside the combustor casing. Further, if the spacer is formed and arranged to guide the air inside the combustor casing to an air inlet of the combustor, the spacer can also realize a so-called flow guide function.

According to another aspect of the present invention, a method of forming a combustor insertion hole of a gas turbine includes: at a time of forming a combustor insertion hole, which is formed on a side periphery of a combustor casing for housing a combustor that burns fuel to generate combustion gas therein to connect inside and outside of the combustor casing, wherein when the combustor inserted into the hole, a member moved together with the combustor, and the hole are viewed from a moving direction of the combustor, the hole includes an entire external form of the combustor and the member moved together with the combustor, a step of forming a first circular hole to be formed in a circular shape about a predetermined point in the combustor casing; and a step of forming a second circular hole to be formed in a circular shape about another point different from the predetermined point in the combustor casing, so that the second circular hole has a portion overlapping on the first circular hole.

When the method of forming the combustor insertion hole according to the present invention is used, the combustor insertion hole can be formed by forming the first circular hole to be formed in a circular shape, which requires relatively small rigidity of the tool at the time of processing, and then forming the second circular hole to be formed in a circular shape, which requires relatively small rigidity of the tool at the time of processing, as in the first circular hole. Therefore, the combustor insertion hole can be formed more easily in the gas turbine. Further, the combustor insertion hole can be formed more accurately in the gas turbine.

EFFECT OF THE INVENTION

The present invention facilitates an assembly operation or a disassembly operation of a gas turbine and ensures strength of a combustor casing.

Figure 1:
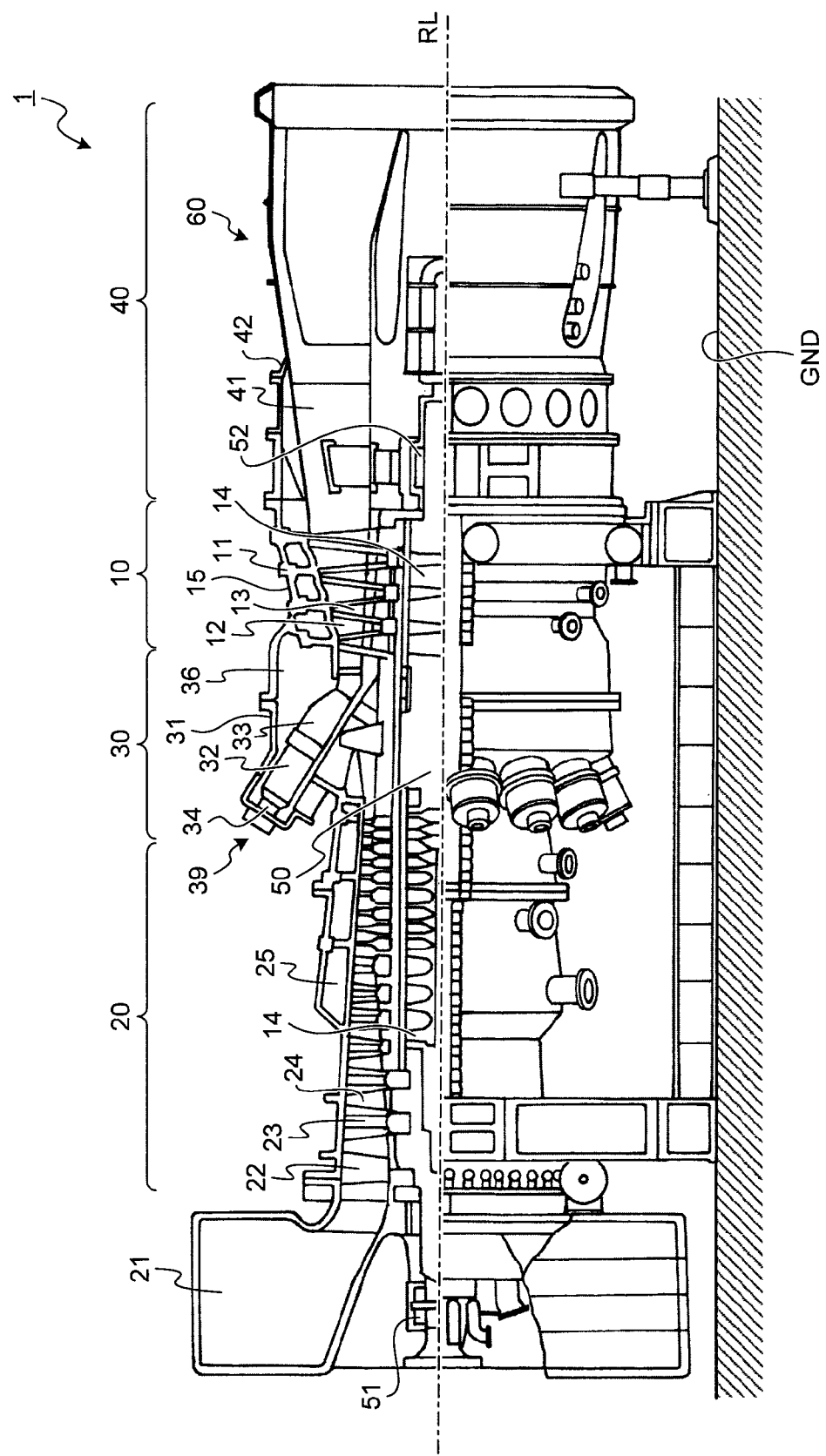
FIG. 1 is a schematic configuration diagram of a gas turbine according to an embodiment of the present invention.

EXPLANATIONS OF LETTERS OR NUMERALS 1 gas turbine
10 turbine unit
11 turbine chamber
12 turbine vane
13 turbine blade
14 disk
15 turbine casing
20 compressor unit
21 air inlet
22 compressor casing
23 compressor vane
24 compressor blade
25 air bleed manifold
30 combustor unit
31 combustor casing
31a combustor insertion hole
31aa first circular hole
31ab second circular hole
32 inner cylinder
33 transition piece
33a steam pipe
34 fuel nozzle
35 air inlet
36 combustor chamber
37 top hat
38 spacer
39 combustor
40 exhaust unit
41 exhaust diffuser
42 exhaust casing
50 rotor
51 bearing
52 bearing
60 casing
C1, C2 center
CL axis
K external form
RL rotation axis

BEST MODE(S) FOR CARRYING OUT THE INVENTION

The present invention is explained below in detail with reference to the accompanying drawings. The present invention is not limited to the best mode for carrying out the invention (hereinafter, "embodiment"). In addition, constituent elements in the embodiment include those that can be easily assumed by persons skilled in the art, that are substantially equivalent, and so-called equivalents.

(First Embodiment)

FIG. 1 is a schematic configuration diagram of a gas turbine according to an embodiment of the present invention. A gas turbine 1 according to the embodiment includes, as shown in FIG. 1, a compressor unit 20, a combustor unit 30, a turbine unit 10, and an exhaust unit 40 in order from an upstream side to a downstream side of a fluid flow.

The compressor unit 20 pressurizes air and feeds the pressurized air to the combustor unit 30. The combustor unit 30 supplies fuel to the pressurized air to burn the fuel. The turbine unit 10 converts energy of combustion gas fed from the combustor unit 30 to rotation energy. The exhaust unit 40 discharges the combustion gas into the atmosphere.

The compressor unit 20 includes an air inlet 21, a compressor casing 22, a compressor vane 23, a compressor blade 24, and an air bleed manifold 25. The air inlet 21 takes in air from the atmosphere into the compressor casing 22.

A plurality of compressor vanes 23 and a plurality of compressor blades 24 are alternatively provided in the compressor casing 22. The air bleed manifold 25 is provided outside of the compressor vanes 23 and the compressor blades 24, to guide the air compressed by the compressor unit 20 to the combustor unit 30.

The combustor unit 30 includes a combustor casing 31 and a combustor 39. A combustor chamber 36 is formed in the combustor casing 31. The combustor 39 includes an inner cylinder 32, a transition piece 33, and a fuel nozzle 34.

The inner cylinder 32 is formed in a substantially cylindrical shape and provided in the combustor chamber 36 as a compressed air passage. The inner cylinder 32 supports a main nozzle and a pilot nozzle that constitute the fuel nozzle 34 therein. The transition piece 33 is also provided in the combustor chamber 36 as the compressed air passage. The transition piece 33 is formed in a cylindrical shape, and a combustion zone in which the fuel burns is formed in the transition piece 33.

Figure 2:
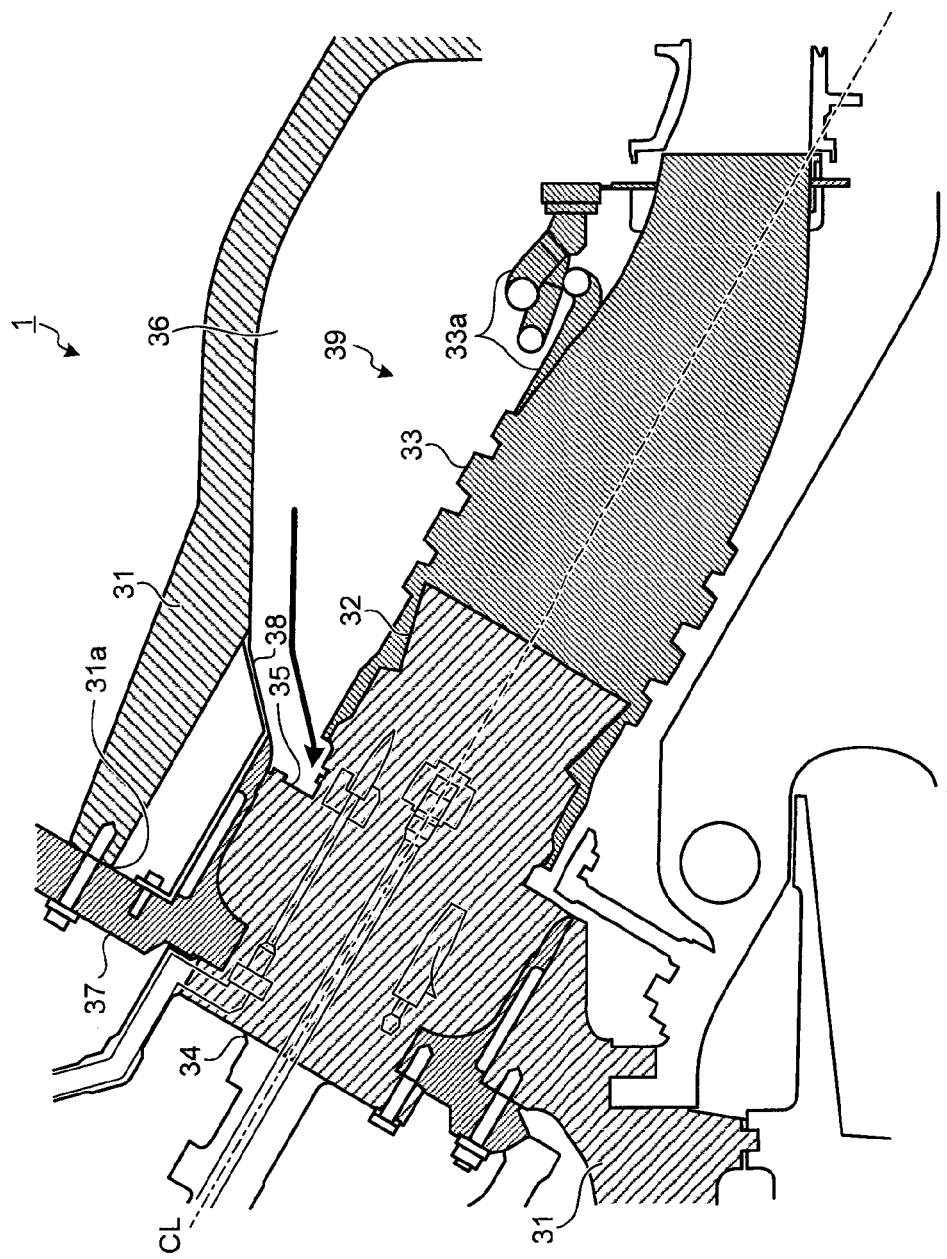
FIG. 2 is a schematic diagram of a vicinity of a combustor according to the embodiment in an enlarged scale.

One end of the inner cylinder 32 in the axial direction is connected to the transition piece 33. A Pipe that supplies fuel to the fuel nozzle 34 arranged in the inner cylinder 32 is connected to the other end of the inner cylinder 32 on the side opposite to the transition piece 33. As shown in FIG. 2, an air inlet 35 that introduces the compressed air into the inner cylinder 32 is formed on an outer peripheral surface of the inner cylinder 32.

The fuel is injected from the fuel nozzle 34 to the compressed air introduced into the inner cylinder 32 via the air inlet 35, and led to the combustion zone in the transition piece 33. The fuel introduced into the combustion zone is ignited by a burner (not shown) and burns to become combustion gas having kinetic energy.

The turbine unit 10 includes a turbine chamber 11, a turbine vane 12, and a turbine blade 13 in a turbine casing 15. A plurality of turbine vanes 12 and a plurality of turbine blades 13 are alternatively arranged in the turbine chamber 11. The exhaust unit 40 includes an exhaust diffuser 41 in an exhaust casing 42. The exhaust diffuser 41 is connected to the turbine unit 10, and rectifies the combustion gas, that is, flue gas having passed through the turbine unit 10.

The gas turbine 1 has a rotor 50 as a rotator. The rotor 50 is provided to penetrate through the central part of the compressor unit 20, the combustor unit 30, the turbine unit 10, and the exhaust unit 40. An end of the rotor 50 on the compressor unit 20 side is rotatably supported by a bearing 51, and an end thereof on the exhaust unit 40 side is rotatably supported by a bearing 52.

The rotor 50 is provided inside a casing 60 to rotate about a rotation axis RL. The rotor 50 includes a plurality of disks 14. The compressor blades 24 and the turbine blades 13 are respectively implanted in the disks 14. A rotation shaft of a power generator (not shown) is connected to the end of the rotor 50 on the compressor unit 20 side.

According to the above configuration, the air taken in from the air inlet 21 in the compressor unit 20 is compressed by the compressor vanes 23 and the compressor blades 24 to become high-temperature and high-pressure compressed air. Subsequently, predetermined fuel is supplied to the compressed air in the combustor unit 30, and the fuel burns.

The energy of the high-temperature and high-pressure combustion gas, which is a working fluid generated in the combustor unit 30, is converted to the rotation energy at the time of passing through the turbine vanes 12 and the turbine blades 13 constituting the turbine unit 10. The rotation energy is transmitted to the rotor 50 via the turbine blades 13 to rotate the rotor 50. Accordingly, the gas turbine 1 drives the power generator connected to the rotor 50. The flue gas having passed through the turbine unit 10 passes through the exhaust diffuser 41 in the exhaust unit 40 and is released into the atmosphere.

FIG. 2 is a schematic diagram of a vicinity of the combustor according to the present embodiment in an enlarged scale. The gas turbine 1 further includes a top hat 37 and a spacer 38. The combustor 39 is inserted into a combustor insertion hole 31a formed in the combustor casing 31 and supported in the combustor chamber 36. In the combustor 39, the inner cylinder 32 is attached to the combustor insertion hole 31a via the top hat 37 in a state in which the inner cylinder 32 and the transition piece 33 are connected to each other. The top hat 37 supports a top hat nozzle inside thereof.

The top hat 37 is connected to the inner cylinder 32. The top hat 37 includes a flange, and the flange is connected to the combustor casing 31 near the combustor insertion hole 31a. Accordingly, the top hat 37 supports the inner cylinder 32 in the combustor chamber 36.

Generally, the combustor insertion hole 31a is formed in a size capable of inserting the inner cylinder 32 and the transition piece 33 formed in a substantially cylindrical shape. That is, the combustor insertion hole 31a is formed in a circular shape having a diameter slightly larger than that of cylindrical portions of the inner cylinder 32 and the transition piece 33. Therefore, in a general gas turbine, a gap between the combustor casing 31 and the inner cylinder 32 is relatively small.

However, in the present embodiment, although details are described later, the combustor insertion hole 31a of the gas turbine 1 is formed larger in a direction orthogonal to a circumferential direction of the combustor casing 31 than that of the general gas turbine.

Accordingly, a gap between the inner cylinder 32 and the combustor casing 31 on the outer circumference side (radially outside with respect to the rotation axis RL of the inner cylinder 32) is larger than that of the general gas turbine.

The spacer 38 is provided in the gap between the inner cylinder 32 and the combustor casing 31. The spacer 38 is, for example, attached to the top hat 37. The spacer 38 fills the gap between the inner cylinder 32 and the combustor casing 31 on the outer circumference side with respect to the rotation axis RL, and equalizes air flow around the combustor 39.

It is desired that the spacer 38 is formed and arranged to guide air in the combustor chamber 36 to the air inlet 35. For example, as shown in FIG. 2, the spacer 38 is formed and arranged to smoothly connect an inner surface of the combustor chamber 36 of the combustor casing 31 and the air inlet 35 to each other. Accordingly, the spacer 38 realizes a flow guide function. The spacer 38 can be attached to the inner cylinder 32.

In the gas turbine 1, for example, the combustor 39 is pulled out from the combustor chamber 36 via the combustor insertion hole 31a at the time of maintenance. When the combustor 39 is to be pulled out from the combustor chamber 36 via the combustor insertion hole 31a, the inner cylinder 32 is detached from the transition piece 33. The combustor 39 is detached from a support member that supports the combustor 39 in the combustor chamber 36. In the combustor 39, the top hat 37 is detached from the combustor casing 31 near the combustor insertion hole 31a.

At this time, the inner cylinder 32, the top hat 37, and the spacer 38 are in an assembled state, that is, integrated with each other. The combustor 39 is pulled out from the combustor chamber 36 via the combustor insertion hole 31a in a state with the inner cylinder 32, the top hat 37, and the spacer being integrated with each other.

Next, in the combustor 39, an end of the transition piece 33 opposite to the inner cylinder 32 is detached from a member of the turbine unit 10. The transition piece 33 is then pulled out from the combustor chamber 36 via the combustor insertion hole 31a. A steam pipe 33a connected to the transition piece 33 is also pulled out from the combustor chamber 36 via the combustor insertion hole 31a as a part of the transition piece 33.

In the present embodiment, a case that the combustor 39 is pulled out from the combustor chamber 36 via the combustor insertion hole 31a is explained. However, the gas turbine 1 has the same action and effect when the combustor 39 is inserted into the combustor chamber 36 via the combustor insertion hole 31a.

As described above, the combustor insertion hole 31a of the general gas turbine is formed in a size capable of inserting the inner cylinder 32 and the transition piece 33 formed in a substantially cylindrical shape. However, the transition piece 33 is formed with an axis of the transition piece 33 being curved from an end thereof connected to the inner cylinder 32 toward an end connected to the member of the turbine unit 10.

Further, an end of the transition piece 33 on the turbine unit 10 side is formed in a substantially rectangular shape. When the combustor 39 is pulled out from the combustor chamber 36 via the combustor insertion hole 31a, the end of the substantially rectangular transition piece 33 tends to interfere with the combustor casing 31 near the combustor insertion hole 31a. When the combustor 39 is pulled out from the combustor chamber 36 via the combustor insertion hole 31a, the steam pipe 33a provided in the transition piece 33 also tends to interfere with the combustor casing 31 near the combustor insertion hole 31a.

Accordingly, in the case of the general gas turbine, when the combustor 39 is pulled out from the combustor insertion hole 31a, the transition piece 33 may interfere with the combustor casing 31 near the combustor insertion hole 31a according to a pulling angle of the combustor 39. Therefore, in the conventional gas turbine, the combustor 39 needs to be pulled out from the combustor chamber 36 via the combustor insertion hole 31a, while being rotated or inclined.

Figure 3:
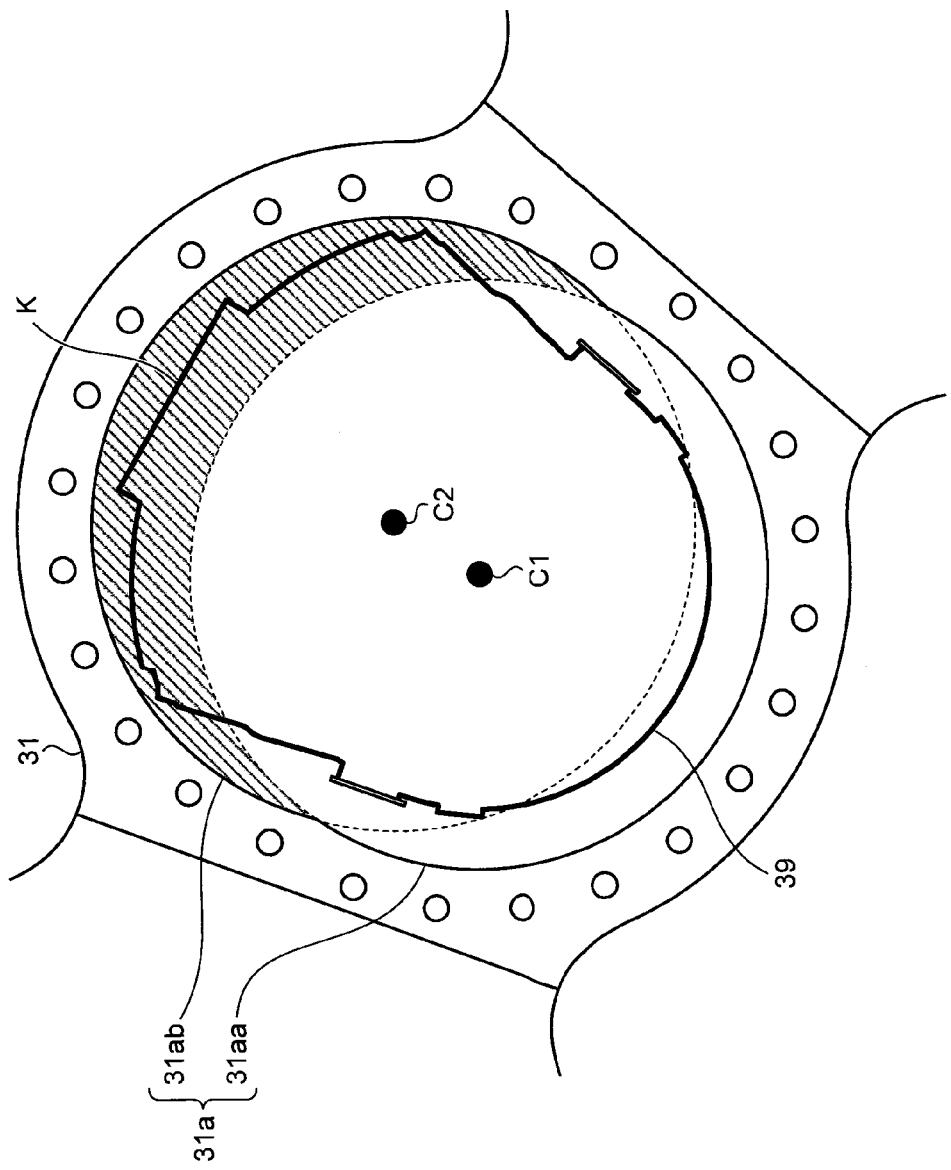
FIG. 3 is a schematic diagram of a combustor insertion hole according to the embodiment as viewed from a direction along an axis of an inner cylinder, when the inner cylinder is arranged in a combustor chamber.

FIG. 3 is a schematic diagram of the combustor insertion hole according to the present embodiment as viewed from a direction along the axis of the inner cylinder, when the inner cylinder is arranged in the combustor chamber. The combustor insertion hole 31a is formed by combining a first circular hole 31aa and a second circular hole 31ab. The first circular hole 31aa and the second circular hole 31ab are combined to form the combustor insertion hole 31a in a shape having a constricted portion such as a tumbling doll shape or a bottle gourd shape.

The first circular hole 31aa and the second circular hole 31ab are formed so that a center C1 of the first circular hole 31aa and a center C2 of the second circular hole 31ab are not overlapped on each other. A distance between the centers C1 and C2 is set smaller than a sum of a radius of the first circular hole 31aa and a radius of the second circular hole 31ab.

For example, the center C1 is formed on an axis CL of the inner cylinder 32 formed in a substantially cylindrical shape shown in FIG. 2. That is, the first circular hole 31aa is formed in a circular shape about the axis CL of the inner cylinder 32.

An external form K shown by a solid line in FIG. 3 indicates a visible outline of the combustor 39 as viewed from a direction along the axis CL of the inner cylinder 32 when the inner cylinder 32 shown in FIG. 2 is arranged in the combustor chamber 36. The external form K indicates an external form of a member of the combustor 39 arranged on the combustor chamber 36 side than the flange of the top hat 37. The external form K is a projection diagram at the time of projecting the combustor 39 from the direction along the axis CL of the inner cylinder 32 when the inner cylinder 32 shown in FIG. 2 is arranged in the combustor chamber 36. Hereinafter, "the axis CL of the inner cylinder 32 when the inner cylinder 32 is arranged in the combustor chamber 36" is simply referred to as "the axis CL of the inner cylinder 32".

The second circular hole 31ab is formed to include the entire external form K of the combustor 39, a part of which is not housed in the first circular hole 31aa, when the combustor insertion hole 31a including the combustor 39 inserted therein is viewed from the direction along the axis CL of the inner cylinder 32 shown in FIG. 2.

That is, the combustor insertion hole 31a is formed so that the first circular hole 31aa and the second circular hole 31ab include the entire external form K of the combustor 39, when the combustor insertion hole 31a including the combustor 39 inserted therein is viewed from the direction along the axis CL of the inner cylinder 32 shown in FIG. 2.

A plurality of combustor insertion holes 31a are arranged in the combustor casing 31 in the circumferential direction thereof. For example, if the combustor insertion hole 31a is formed in a substantially circular shape as one hole so that the entire external form K of the combustor 39 is included, when the combustor insertion hole 31a including the combustor 39 inserted therein is viewed from the direction along the axis CL of the inner cylinder 32 shown in FIG. 2, the distance between the adjacent combustor insertion holes 31a becomes smaller than that of the conventional gas turbine.

Accordingly, if the combustor insertion hole 31a is formed in a substantially circular shape as one hole so that the entire external form K of the combustor 39 is included, when the combustor insertion hole 31a including the combustor 39 inserted therein is viewed from the direction along the axis CL of the inner cylinder 32 shown in FIG. 2, the strength of the combustor casing 31 between the adjacent combustor insertion holes 31a may decrease.

When the combustor insertion hole 31a is formed in the shape having a constricted portion, a virtual line connecting the centers C1 and C2 is normally along a direction substantially orthogonal to the circumferential direction of the combustor casing 31. That is, the size of the combustor insertion hole 31a in a direction orthogonal to the circumferential direction of the combustor casing 31 is larger than that in the circumferential direction of the combustor casing 31. This is because the external form K of the combustor 39 is relatively larger in the direction orthogonal to the circumferential direction of the combustor casing 31, when the combustor insertion hole 31a including the combustor 39 inserted therein is viewed from the direction along the axis CL of the inner cylinder 32 shown in FIG. 2.

Therefore, when the combustor insertion hole 31a is formed in the shape having a constricted portion, a decrease in the distance between the adjacent combustor insertion holes 31a is suppressed in the gas turbine 1. As a result, a decrease in the strength of the combustor casing 31 between the adjacent combustor insertion holes 31a can be suppressed in the gas turbine 1.

For example, the combustor insertion hole 31a can be formed in a substantially elliptical shape to include the entire external form K of the combustor 39, when the combustor insertion hole 31a including the combustor 39 inserted therein is viewed from the direction along the axis CL of the inner cylinder 32 shown in FIG. 2. Even in this case, a decrease in the distance between the adjacent combustor insertion holes 31a is suppressed in the gas turbine 1. As a result, a decrease in the strength of the combustor casing 31 between the adjacent combustor insertion holes 31a can be suppressed in the gas turbine 1.

In this case, because the shape of an opening of the combustor insertion hole 31a formed in a substantially elliptical shape is formed more smoothly than the shape of the combustor insertion hole formed by combining the first circular hole 31aa and the second circular hole 31ab, a stress concentrating portion is reduced.

When the combustor insertion hole 31a is formed in a substantially elliptical shape, the combustor insertion hole 31a is processed by an end mill by using, for example, a machine tool. However, a thickness of the combustor casing 31 is generally about 100 millimeters. Therefore, when the combustor insertion hole 31a is formed in a substantially elliptical shape, processing accuracy of the combustor insertion hole 31a may decrease due to insufficient rigidity of the end mill of the machine tool. With the machine tool, the combustor insertion hole 31a may not be formed by the end mill.

However, as described above, if the combustor insertion hole 31a is formed in the shape having a constricted portion such as a tumbling doll shape or a bottle gourd shape by combining the first circular hole 31aa and the second circular hole 31ab, the combustor insertion hole 31a is easily formed by a processing method of the combustor insertion hole 31 explained below.

When the combustor insertion hole 31a is formed in the shape having a constricted portion, the first circular hole 31aa of the combustor insertion hole 31a is first formed about the center C1 by inner periphery processing using an inner-diameter cutting tool. The cutting tool forms the first circular hole 31aa while moving about the center C1 to draw a circle. According to this processing method, relatively large rigidity is not required for the cutting tool. Therefore, the machine tool can accurately form the first circular hole 31aa, regardless of the thickness of the combustor casing 31.

The second circular hole 31ab of the combustor insertion hole 31a is then formed about the center C2 by the cutting tool. The cutting tool forms the second circular hole 31ab while moving about the center C2 to draw a circle. According to this processing method, as described above, relatively large rigidity is not required for the cutting tool. Therefore, the machine tool can accurately form the second circular hole 31ab, regardless of the thickness of the combustor casing 31.

Accordingly, the first circular hole 31aa and the second circular hole 31ab are formed as one combustor insertion hole 31a. The combustor insertion hole 31a is formed more easily than the case that the combustor insertion hole 31a is formed in a substantially elliptical shape, and processing man-hour is reduced according to the processing method.

According to the above configuration and the processing method, in the gas turbine 1, the combustor insertion hole 31a is formed in the shape having a constricted portion such as a tumbling doll shape or a bottle gourd shape by combining the first circular hole 31aa and the second circular hole 31ab, thereby enabling to facilitate the processing of the combustor insertion hole 31, and suppress a decrease in the strength of the combustor casing 31 between the adjacent combustor insertion holes 31a.

Figure 4:
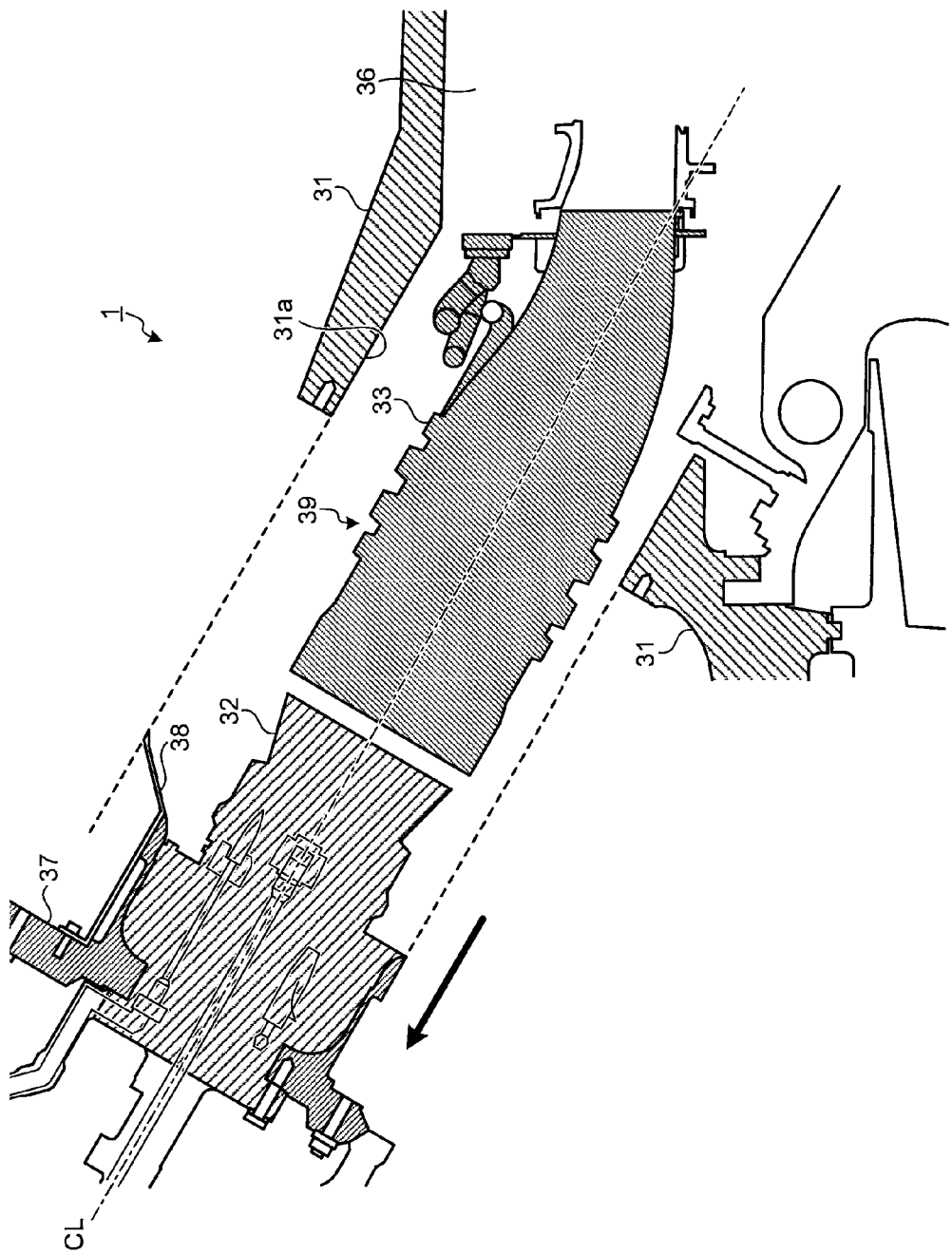
FIG. 4 is a schematic diagram of a state when the combustor according to the present embodiment is pulled out from the combustor chamber via the combustor insertion hole.

FIG. 4 is a schematic diagram of a state when the combustor according to the present embodiment is pulled out from the combustor chamber via the combustor insertion hole. As shown in FIG. 4, the combustor 39 is pulled out from the combustor chamber 36 via the combustor insertion hole 31a in a state with the top hat 37 and the spacer 38 being integrated.

As shown in FIG. 3, the combustor insertion hole 31a includes the entire external form K of the combustor 39 when the combustor insertion hole 31a including the combustor 39 inserted therein is viewed from the direction along the axis CL of the inner cylinder 32. Therefore, the inner cylinder 32, the top hat 37, and the spacer 38 do not interfere with the combustor casing 31 near the combustor insertion hole 31a, even if these are moved on a straight line along the direction of the axis CL of the inner cylinder 32.

As shown in FIG. 4, the transition piece 33 is moved on the straight line along the direction of the axis CL of the inner cylinder 32, and is pulled out from the combustor chamber 36 via the combustor insertion hole 31a. At this time, the transition piece 33 does not interfere with the combustor casing 31 near the combustor insertion hole 31a.

Accordingly, the combustor 39 of the gas turbine 1 is pulled out from the combustor chamber 36 via the combustor insertion hole 31a without being rotated or inclined. Further, the combustor 39 of the gas turbine 1 is inserted into the combustor chamber 36 via the combustor insertion hole 31a without being rotated or inclined.

With this configuration, in the gas turbine 1, for example, an assembly operation or a disassembly operation of the gas turbine 1 at the time of maintenance is facilitated. As a result, working hours required for the assembly operation or the disassembly operation of the gas turbine 1 can be reduced in the gas turbine 1.

It has been explained that the combustor 39 is moved on a straight line along the axis CL of the inner cylinder 32; however, the present embodiment is not limited thereto. The combustor 39 can be moved on the straight line along a moving direction of the combustor 39 and pulled out from the combustor chamber 36 via the combustor insertion hole 31a, or inserted into the combustor chamber 36 via the combustor insertion hole 31a.

In this case, the first circular hole 31aa and the second circular hole 31ab of the combustor insertion hole 31a are formed so that the first circular hole 31aa and the second circular hole 31ab include the entire external form K of the combustor 39, when the combustor insertion hole 31a including the combustor 39 inserted therein is viewed from the moving direction of the combustor 39.

Accordingly, the gas turbine 1 includes the combustor insertion hole 31a, which is formed on a side periphery of the combustor casing 31, where a size thereof in a direction along the central axis of the combustor casing 31 is formed larger than that in a circumferential direction of the combustor casing 31, and when the combustor inserted into the hole, a member moved together with the combustor 39, and the hole are viewed from a moving direction of the combustor 39, the hole includes the entire external form K of the combustor 39 and the member moved together with the combustor 39.

With this configuration, in the gas turbine 1, for example, an assembly operation or a disassembly operation of the gas turbine 1 at the time of maintenance is facilitated. As a result, working hours required for the assembly operation or the disassembly operation of the gas turbine 1 can be reduced in the gas turbine 1.

Industrial Applicability

As described above, the gas turbines according to the present embodiment is suitable for a gas turbine having a configuration such that a combustor is pulled out from a combustor casing via a combustor insertion hole or the combustor is inserted into the combustor casing via the combustor insertion hole.

The invention claimed is:
1. A gas turbine comprising:
a combustor including an inner cylinder and adapted to burn fuel to generate combustion gas;
a combustor casing having a cylindrical shape around a rotational axis of the gas turbine to form a combustor chamber therein for housing the combustor therein; and
the combustor casing defining a combustor insertion hole therethrough along a circumferential direction in a portion on a compressor side of the gas turbine to connect an inside portion and an outside portion of the combustor casing, wherein the combustor is inserted into or pulled from the combustor chamber through the combustor insertion hole, wherein the diameter of the combustor insertion hole in a direction orthogonal to a circumferential direction of the combustor casing is larger than the diameter of the combustor insertion hole in the circumferential direction of the combustor casing as viewed from a direction along with an axis of the inner cylinder, and when the combustor is inserted into the combustor insertion hole, the combustor insertion hole accommodates an entire external form of the combustor as viewed from the direction along the axis of the inner cylinder.

2. The gas turbine according to claim 1, wherein the combustor insertion hole is formed by combining a plurality of circular holes with centers thereof being different from each other.

3. The gas turbine according to claim 1, further comprising a spacer disposed in a gap between the combustor and an inner peripheral surface of the combustor insertion hole, wherein when installing the combustor inside the combustor casing, the spacer fills the gap generated between the combustor and the inner peripheral surface of the combustor insertion hole.

4. The gas turbine according to claim 1, wherein the combustor includes a member moved together with the combustor during maintenance, and the combustor insertion hole accommodates an entire external form of the combustor as viewed from the direction along the axis of the inner cylinder when the combustor and the member are inserted in the combustor insertion hole.

* * * * *